(12) United States Patent
Khanzode et al.

(10) Patent No.: US 11,062,129 B2
(45) Date of Patent: Jul. 13, 2021

(54) SYSTEMS AND METHODS FOR ENABLING SEARCH SERVICES TO HIGHLIGHT DOCUMENTS

(71) Applicant: Veritas US IP Holdings LLC, Mountain View, CA (US)

(72) Inventors: Sandeep Khanzode, Mumbai (IN); Nilesh Salpe, Pune (IN); Vishrut Goyal, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 743 days.

(21) Appl. No.: 15/041,039

(22) Filed: Feb. 11, 2016

(65) Prior Publication Data

US 2017/0193060 A1 Jul. 6, 2017

(51) Int. Cl.
*G06F 16/22* (2019.01)
*G06K 9/00* (2006.01)
(Continued)

(52) U.S. Cl.
CPC ....... *G06K 9/00442* (2013.01); *G06F 16/338* (2019.01); *G06K 9/00993* (2013.01); *G06K 9/626* (2013.01); *G06K 9/6807* (2013.01)

(58) Field of Classification Search
CPC ......... G06F 17/30864; G06F 17/30321; G06F 17/30091; G06F 17/30345;
(Continued)

(56) References Cited

U.S. PATENT DOCUMENTS 7,660,813 B2 * 2/2010 Milic-Frayling ... G06F 16/9535
707/999.102
7,707,139 B2 * 4/2010 Okamoto .............. G06F 16/951
707/758

(Continued)

FOREIGN PATENT DOCUMENTS

CA 2715698 A1 * 3/2012 ....... G06F 17/30867

OTHER PUBLICATIONS

"Search-highlighter", https://github.com/wikimedia/search-highlighter, as accessed Dec. 8, 2015, (On or before Dec. 8, 2015).
(Continued)

*Primary Examiner* — Alex Gofman
*Assistant Examiner* — Linh Black
(74) *Attorney, Agent, or Firm* — FisherBroyles, LLP

(57) ABSTRACT

The disclosed computer-implemented method for enabling search services to highlight documents may include (1) creating, via an internal search service, a highlight index that comprises an analyzer for at least one type of document, (2) receiving a search query configured for an external search service and a document that is of the type and that comprises a search result for the search query, (3) querying the highlight index in order to retrieve the analyzer for the type of document from the highlight index, and (4) sending the analyzer, the document, and the search query to a search service in order to enable the search service to display at least one highlighted string extracted from the document via the analyzer, wherein the highlighted string originates from the search query. Various other methods, systems, and computer-readable media are also disclosed.

17 Claims, 7 Drawing Sheets

(51) Int. Cl.
*G06K 9/62* (2006.01)
*G06K 9/68* (2006.01)
*G06F 16/338* (2019.01)

(58) Field of Classification Search
CPC ......... G06F 17/30389; G06F 17/30631; G06F 17/30336; G06F 17/30094; G06F 17/30613; G06F 17/30616; G06F 17/30619; H05K 999/99
USPC ................. 707/602, 711, 741, 746, 791, 830
See application file for complete search history.

(56) References Cited

U.S. PATENT DOCUMENTS

| | | | | |
|---|---|---|---|---|
| 8,090,710 | B2* | 1/2012 | Barsness | G06F 16/2471 707/713 |
| 9,858,967 | B1* | 1/2018 | Nomula | G11B 27/322 |
| 10,042,885 | B2* | 8/2018 | Hamilton, II | G06F 1/3234 |
| 2002/0065814 | A1* | 5/2002 | Okamoto | G06F 16/81 |
| 2003/0220915 | A1* | 11/2003 | Fagan | G06F 17/30722 |
| 2004/0100510 | A1* | 5/2004 | Milic-Frayling | G06F 17/30905 715/864 |
| 2004/0260687 | A1* | 12/2004 | Mano | G06F 17/30696 |
| 2006/0047649 | A1* | 3/2006 | Liang | G06F 16/951 |
| 2006/0064716 | A1* | 3/2006 | Sull | G06F 17/30793 725/37 |
| 2006/0116994 | A1* | 6/2006 | Jonker | G06Q 10/04 |
| 2006/0156222 | A1* | 7/2006 | Chi | G06F 17/241 715/231 |
| 2007/0226189 | A1* | 9/2007 | Piekos | G06F 16/957 |
| 2007/0288437 | A1* | 12/2007 | Xia | G06F 17/30241 |
| 2010/0306249 | A1* | 12/2010 | Hill | G06Q 30/02 707/769 |
| 2010/0332475 | A1* | 12/2010 | Birdwell | G06K 9/6224 707/737 |
| 2011/0055192 | A1* | 3/2011 | Tang | G06F 16/3344 707/706 |
| 2012/0167047 | A1* | 6/2012 | Wyler | H04W 4/00 717/122 |
| 2013/0007004 | A1* | 1/2013 | Rai | G06F 17/30622 707/742 |
| 2013/0091144 | A1* | 4/2013 | Peters | G06F 16/2462 707/748 |
| 2013/0132854 | A1* | 5/2013 | Raleigh | H04W 4/60 715/738 |
| 2013/0173798 | A1* | 7/2013 | Micucci | H04L 67/1044 709/225 |
| 2014/0046976 | A1* | 2/2014 | Zhang | G06Q 30/0255 707/772 |
| 2014/0129332 | A1* | 5/2014 | Ramer | G06Q 30/0261 705/14.53 |
| 2014/0282219 | A1* | 9/2014 | Haddock | G06F 16/36 715/781 |
| 2014/0334746 | A1* | 11/2014 | Petrou | G06F 17/30253 382/306 |
| 2015/0074080 | A1* | 3/2015 | Pidduck | G06F 17/30117 707/711 |
| 2015/0278902 | A1* | 10/2015 | Warren | G06Q 30/0623 705/26.61 |
| 2016/0098485 | A1* | 4/2016 | Burke | G06F 3/0482 707/706 |
| 2017/0060856 | A1* | 3/2017 | Turtle | G06F 16/93 |
| 2018/0301222 | A1* | 10/2018 | Dew, Sr. | G06N 5/022 |

OTHER PUBLICATIONS

"Elasticsearch Reference [2.0]", https://www.elastic.co/guide/en/elasticsearch/reference/2.0/mapping-source-field.html, as accessed Dec. 8, 2015, (On or before Dec. 8, 2015).

"Elasticsearch—PlainHighlighter.java", https://github.com/elastic/elasticsearch/blob/6b19aebab0a9ba55faf049758856e7ff112c7747/core/src/main/java/org/elasticsearch/search/highlight/PlainHighlighter.java, as accessed Dec. 8, 2015, (Sep. 9, 2015).

Karevoll, Njal, "Writing an Elasticsearch Plugin: Getting Started", https://www.elastic.co/blog/found-writing-a-plugin, as accessed Dec. 8, 2015, (Sep. 10, 2013).

"Lucene", https://en.wikipedia.org/wiki/Lucene, as accessed Dec. 8, 2015, Wikipedia, (Nov. 1, 2004).

* cited by examiner

SYSTEMS AND METHODS FOR ENABLING SEARCH SERVICES TO HIGHLIGHT DOCUMENTS

BACKGROUND

The more data a person or organization has access to, the more they need a good search service in order to find the right data at the right time. Most search services not only retrieve links to relevant documents, but also display snippets of the contents of the documents that highlight the search terms. Highlighting search results in this manner allows users to readily identify the document or documents they are looking for and also provides confirmation to users that the search service is effective and is indeed returning documents that contain the searched-for terms.

However, a search service may only provide highlighted snippets from the documents if the search service has direct access to the content of the documents. Many traditional systems store the contents of the documents indexed by the search service. Unfortunately, search services that store the contents of documents may give rise to security problems. Many organizations now use external search services and would prefer that these external services not have access to the contents of the organizations' documents. Accordingly, the instant disclosure identifies and addresses a need for additional and improved systems and methods for enabling search services to highlight documents.

SUMMARY

As will be described in greater detail below, the instant disclosure describes various systems and methods for enabling search services to highlight documents by separating the highlight service from the document search service.

In one example, a computer-implemented method for enabling search services to highlight documents may include (1) creating, via an internal search service, a highlight index that includes an analyzer for at least one type of document, (2) receiving a search query configured for an external search service and a document that is of the type and that includes a search result for the search query, (3) querying the highlight index in order to retrieve the analyzer for the type of document from the highlight index, and (4) sending the analyzer, the document, and the search query to a search service in order to enable the search service to display at least one highlighted string extracted from the document via the analyzer, where the highlighted string originates from the search query.

In some examples, creating the highlight index may include creating a search index that may include exactly one document. In one embodiment, creating the highlight index may include creating a dummy document attribute field and populating the dummy document attribute field with the same predetermined value for every document in the highlight index. In this embodiment, querying the highlight index may include searching for at least one document where a value of the dummy document attribute field includes the predetermined value. Additionally or alternatively, creating, via the internal search service, the highlight index that may include the analyzer for the type of document may include duplicating an analyzer from the external search service for the type of document.

In some examples, receiving the search query configured for the external search service may include receiving the search query from the external search service. Additionally or alternatively, receiving the document that includes the search result for the search query may include receiving the document from a data store after the document has been retrieved from the data store via sending the data store a document identifier found by the external search service.

In one embodiment, the computer-implemented method may further include displaying, by the search service, a displayed search result for the search query that may include an identifier of the document and the highlighted string. In one embodiment, the external search service may only store a portion of the content of the document in lieu of storing the complete contents of the document.

In one embodiment, a system for implementing the above-described method may include (1) a creation module, stored in memory, that creates, via an internal search service, a highlight index that may include an analyzer for at least one type of document, (2) a receiving module, stored in memory, that receives a search query configured for an external search service and a document that is of the type and that may include a search result for the search query, (3) a querying module, stored in memory, that queries the highlight index in order to retrieve the analyzer for the type of document from the highlight index, (4) a sending module, stored in memory, that sends the analyzer, the document, and the search query to a search service in order to enable the search service to display at least one highlighted string extracted from the document via the analyzer, where the highlighted string originates from the search query, and (5) at least one physical processor configured to execute the creation module, the receiving module, the querying module, and the sending module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) create, via an internal search service, a highlight index that includes an analyzer for at least one type of document, (2) receive a search query configured for an external search service and a document that is of the type and that includes a search result for the search query, (3) query the highlight index in order to retrieve the analyzer for the type of document from the highlight index, and (4) send the analyzer, the document, and the search query to a search service in order to enable the search service to display at least one highlighted string extracted from the document via the analyzer, where the highlighted string originates from the search query.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
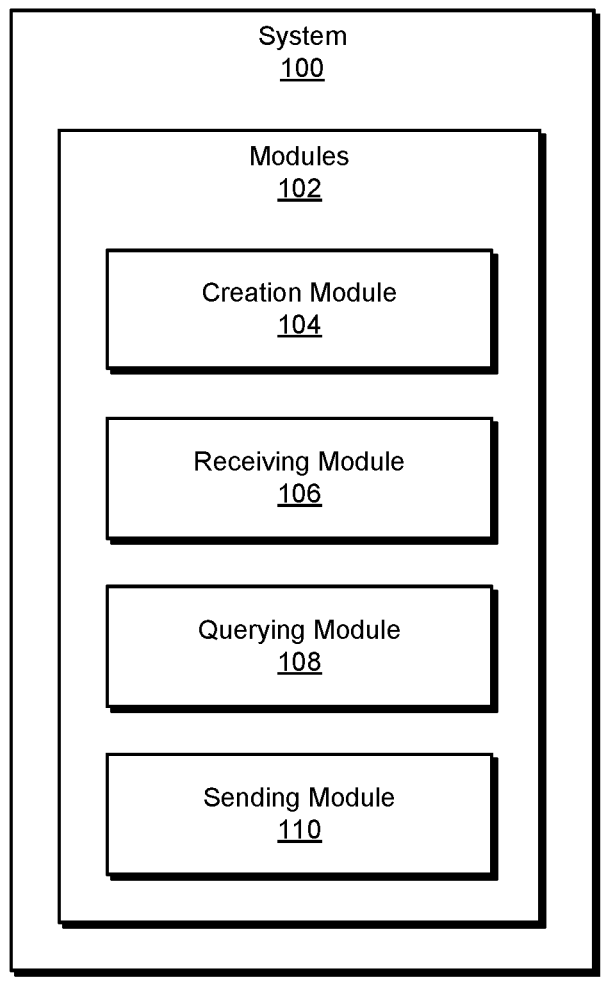
FIG. 1 is a block diagram of an exemplary system for enabling search services to highlight documents.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enabling search services to highlight documents. As will be explained in greater detail below, by sending documents to an internal search service for highlighting rather than relying on an external search service to provide search result highlighting, the systems and methods described herein may enable search services to provide highlighted results more efficiently and with fewer security concerns.

The following will provide, with reference to FIGS. 1, 2, 4, and 5, detailed descriptions of exemplary systems for enabling search services to highlight documents. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for enabling search services to highlight documents. As illustrated in this figure, exemplary system 100 may include one or more modules 102 for performing one or more tasks. For example, and as will be explained in greater detail below, exemplary system 100 may include a creation module 104 that creates, via an internal search service, a highlight index that may include an analyzer for at least one type of document. Exemplary system 100 may additionally include a receiving module 106 that receives a search query configured for an external search service and a document that is of the type and that may include a search result for the search query. Exemplary system 100 may also include a querying module 108 that queries the highlight index in order to retrieve the analyzer for the type of document from the highlight index. Exemplary system 100 may additionally include a sending module 110 that sends the analyzer, the document, and the search query to a search service in order to enable the search service to display at least one highlighted string extracted from the document via the analyzer, where the highlighted string originates from the search query. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
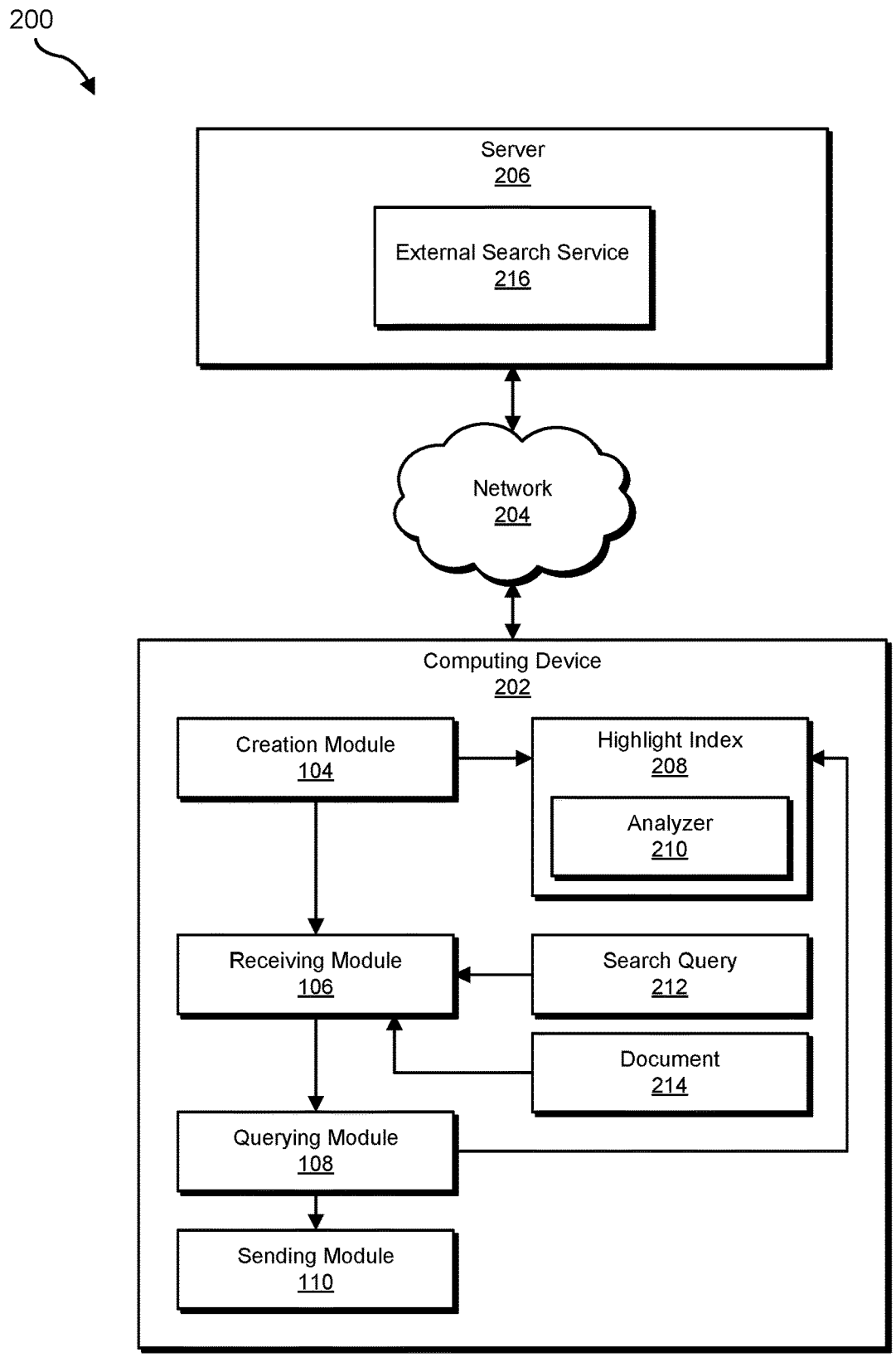
FIG. 2 is a block diagram of an additional exemplary system for enabling search services to highlight documents.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to enable search services to highlight documents. For example, and as will be described in greater detail below, creation module 104 may create, via an internal search service, a highlight index 208 that may include an analyzer 210 for at least one type of document 214. At some later time, receiving module 106 may receive a search query 212 configured for an external search service 216 and a document 214 that is of the type and that may include a search result for search query 212. Next, querying module 108 may query highlight index 208 in order to retrieve analyzer 210 for the type of document 214 from the highlight index 208. Finally, sending module 110 may send analyzer 210, document 214, and search query 212 to a search service in order to enable the search service to display at least one highlighted string extracted from document 214 via analyzer 210, where the highlighted string originates from search query 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of hosting a search service. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
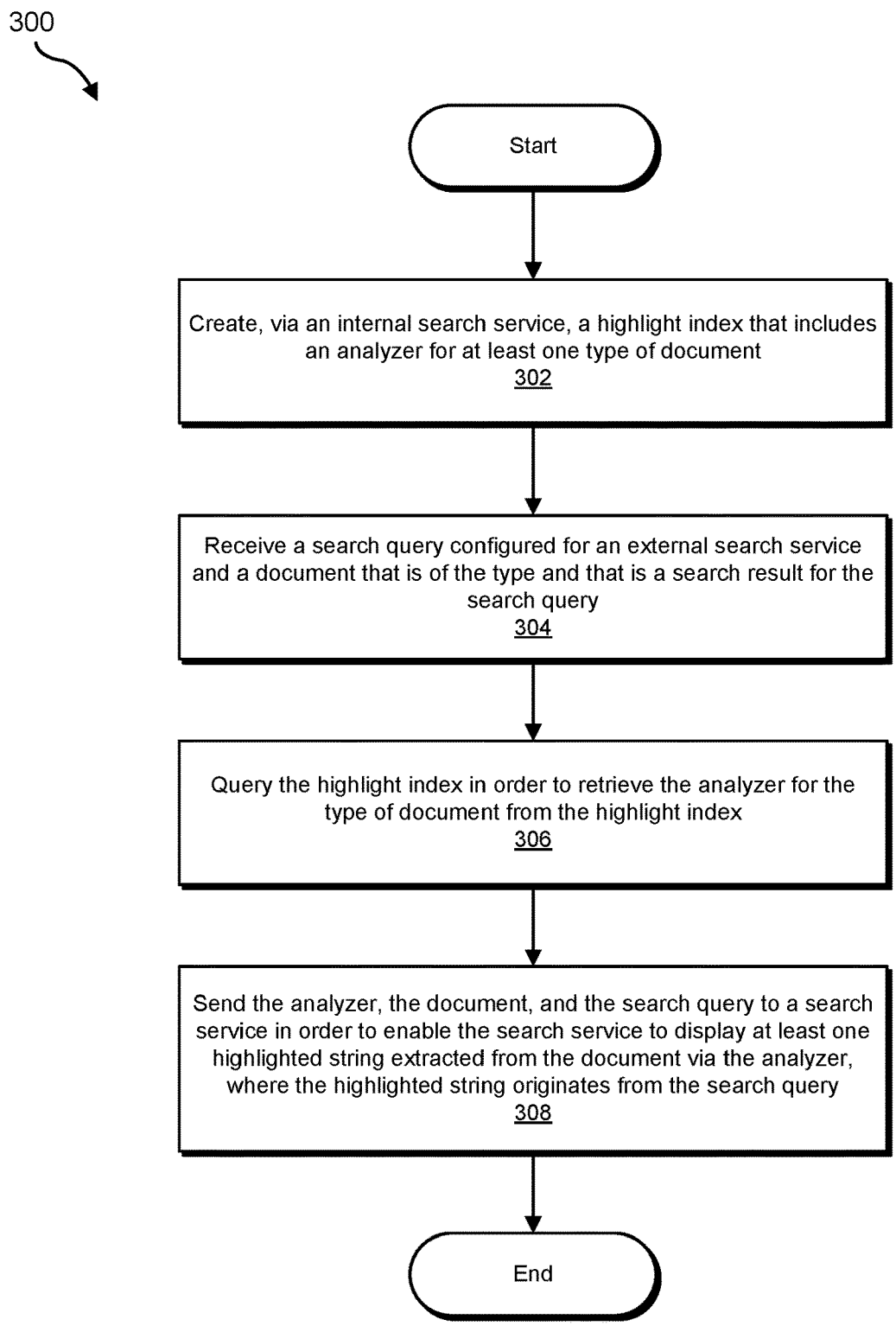
FIG. 3 is a flow diagram of an exemplary method for enabling search services to highlight documents.

FIG. 3 is a flow diagram of an exemplary computer-implemented method 300 for enabling search services to highlight documents. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may create, via an internal search service, a highlight index that may include an analyzer for at least one type of document. For example, creation module 104 may, as part of computing device 202 in FIG. 2, create, via an internal search service, highlight index 208 that may include analyzer 210 for at least one type of document 214.

The term "search service," as used herein, generally refers to any service, application, and/or system that searches for and identifies items (e.g., files, records, and/or documents) that correspond to keywords specified by a user. In some embodiments, a search service may have the ability to receive a query from a user, analyze the query, tokenize the query into different strings that apply to different fields or parts of fields, filter the strings, and search an index of items based on the analyzed query. In some embodiments, a search service may return one or more document identifiers (document IDs) that correspond to documents found in the index. In other embodiments, a search service may return one or more documents. In some embodiments, a search service may display descriptions of, names of, and/or pointers to the found documents. Additionally or alternatively, a search service may display portions of the found documents with one or more search query terms highlighted. In some embodiments, a search service may delegate one or more of the aforementioned functions to one or more additional search services.

The term "internal search service," as used herein, generally refers to any search services for which the systems described herein have created at least one search index. In some embodiments, an internal search service may be hosted on one or more servers administered by the systems described herein. In some embodiments, the systems described herein may send retrieved documents and search queries to an internal search service in order to be able to display snippets of the retrieved documents with terms from the search query highlighted. Examples of an internal search service include, without limitation, ELASTICSEARCH and/or LUCENE.

The term "external search service," as used herein, generally refers to any search service that the systems described herein do not use to highlight content from retrieved documents. In some embodiments, an external search service may be hosted on servers that are not administered by the systems described herein. In one embodiment, the external search service may only store a portion of the content of the documents that are indexed by the external search service rather than the complete contents of the documents. For example, an organization may use an external search service to search their documents rather than building and/or hosting their own search service, but may not want the external service to have access to the contents of company-confidential documents.

The term "analyzer," as used herein, generally refers to any script, application, algorithm, set of algorithms, and/or portion of an application that is designed to perform analysis of input text at indexing time and/or analysis of a search query at search time. In some embodiments, an analyzer may include a tokenizer that separates out tokens (i.e., strings) from a search query and correlate those tokens with the appropriate fields or portions of fields. For example, a user may input a complex search query that specifies they are searching for emails from a user named "skhanzode" that were sent within the last month and contain the phrase "malicious toaster." In this example, a tokenizer may tokenize this query by determining that the token "skhanzode" correlates to items in the field "sender," and more specifically to strings that come before an "@" sign in the "sender" field. The tokenizer may also determine that the "date: within the last month" setting should be transformed into the string "received_month=current_date.month" and applied to the "time_received field." Additionally, the tokenizer may determine that the string "malicious toaster" should be applied to the "subject" field and/or the "email_body" field. In some examples, an analyzer may perform lexical analysis, for example, to determine that the search query is in German and thus should be parsed differently than a search query in English. In some embodiments, an analyzer may also include one or more filters that transform a search query before, during, and/or after tokenization. For example, an analyzer may transform a string entirely into lower-case, perform stemming and/or lemmatization (e.g., replacing "ran" or "running" with "run" and/or using synonyms), remove common words (e.g., "the," "is," and/or "of"), and/or remove markup (e.g., removing hypertext markup language characters). Additionally or alternatively, an analyzer may also perform term weighting, for example, by examining the frequency of each term in the search query.

The term "highlight index," as used herein, generally refers to any search index that is equipped with an analyzer for one or more document types. In some embodiments, a highlight index may be a search index created for an internal search service by the systems described herein.

Creation module 104 may create the highlight index in a variety of ways. In one embodiment, creation module 104 may create the highlight index that includes the analyzer for the type of document by duplicating an analyzer from the external search service for the type of document. In another embodiment, creation module 104 may use an internal search service that already includes an analyzer for the type of document and may create a highlight index that includes the already-present analyzer.

In one embodiment, creation module 104 may create the highlight index by creating a dummy document attribute field and populating the dummy document attribute field with the same predetermined value for every document in the highlight index. In this embodiment, any queries sent to the highlight index may search for at least one document where a value of the dummy document attribute field is the predetermined value, thus guaranteeing that the search will return. In one embodiment, creation module 104 may create the highlight index by creating a search index that includes exactly one document. In some embodiments, creation module 104 may create multiple highlight indexes for multiple types of documents. In other embodiments, creation module 104 may create a single highlight index that includes analyzers for multiple types of documents.

Figure 4:
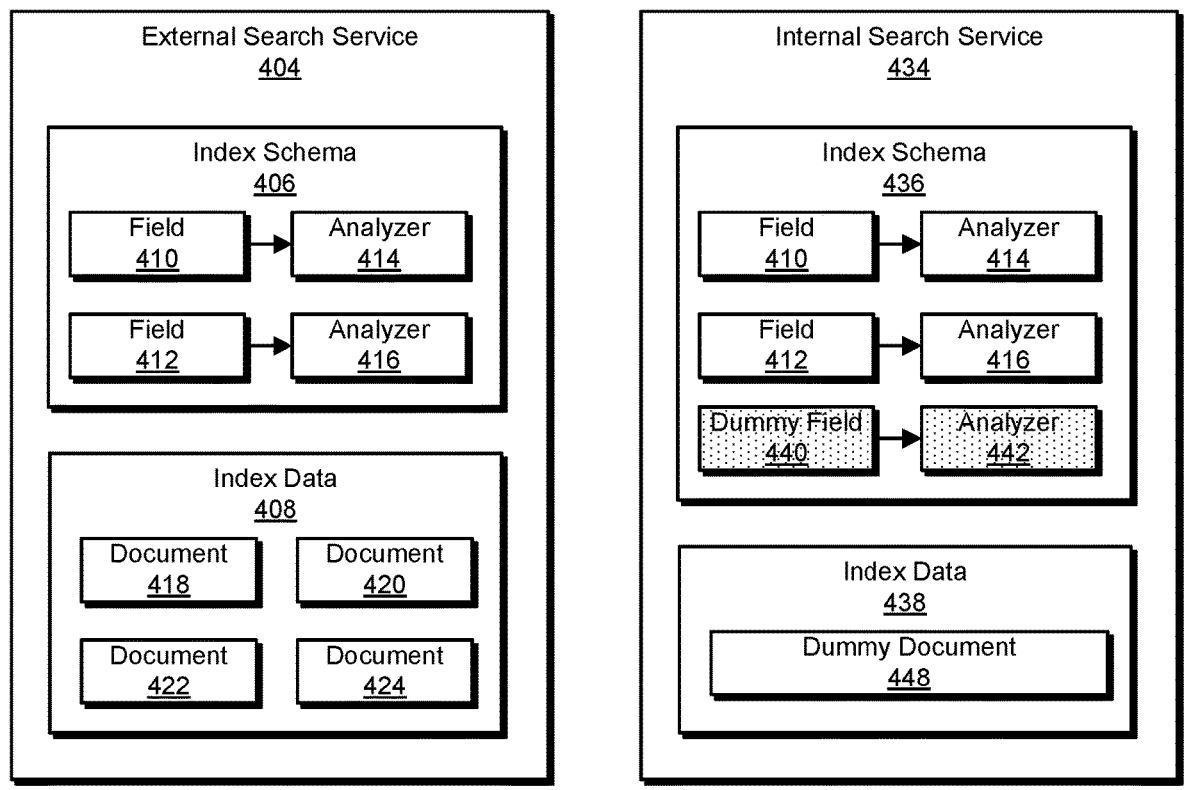
FIG. 4 is a block diagram of an exemplary computing system for enabling search services to highlight documents.

As illustrated in FIG. 4, creation module 104 may create an index schema 436 for an internal search service 434 that includes almost the same fields as an index schema 406 for an external search service 404. In this example, index schema 406 may include fields 410 and/or 412 that correspond to analyzers 414 and/or 416, respectively. Index schema 436 may include all of the same fields and analyzers from index schema 406 with the addition of dummy field 440 and analyzer 442. In some embodiments, all of the documents in index data 438 for internal search service 434 may have dummy field 440 set to the same predetermined value.

In some embodiments, external search service 404 may include index data 408 that contains document IDs and/or documents 418, 420, 422, and/or 424. By contrast, index data 438 for external search service 434 may include only a single dummy document 448. In some embodiments, index data 438 may be the highlight index created by creation module 104.

Returning to FIG. 3, at step 304, one or more of the systems described herein may receive a search query configured for an external search service and a document that is of the type and that may include a search result for the search query. For example, receiving module 106 may, as part of computing device 202 in FIG. 2, receive search query 212 configured for external search service 216 and document 214 that is of the type and that may include a search result for search query 212.

Receiving module 106 may receive the search query in a variety of contexts. In some embodiments, receiving module 106 may be part of a search service that includes a user interface and may receive the search query directly from a user. In this embodiment, receiving module 106 may then forward the search query to the external search service.

In some embodiments, receiving module 106 may receive the search query from the external search service. In some of these embodiments, receiving module 106 may also receive one or more document IDs from the external search service. In one embodiment, receiving module 106 may then send the document IDs to a data store in order to retrieve the documents. Additionally or alternatively, receiving module 106 may receive one or more documents that are search results for the search query from a data store via sending the data store a document ID found by the external search service.

At step 306, one or more of the systems described herein may query the highlight index in order to retrieve the analyzer for the type of document from the highlight index. For example, querying module 108 may, as part of computing device 202 in FIG. 2, query highlight index 208 in order to retrieve analyzer 210 for the type of document 214 from the highlight index 208.

Querying module 108 may query the highlight index for to retrieve the analyzer in a variety of contexts. For example, querying module 108 may be part of the internal search service and may receive the query and then return the results. In another embodiment, querying module 108 may be part of a search service that may send the query to the internal search service. In some embodiments, all documents within the highlight index may have a dummy field with a predetermined value. In these embodiments, querying module 108 may amend the search query configured for the external search service to add the predetermined value for the dummy field, guaranteeing that the query will return. Additionally or alternatively, querying module 108 may query the highlight index with the unaltered search query configured for the external search service and/or may alter the search query only enough to make it compatible with the internal search service. In some examples, the highlight index may contain exactly one document, guaranteeing that the query will return very quickly.

In some embodiments, the internal search service may contain only one highlight index that includes analyzers for multiple document types and querying module 108 may query that highlight index. In other embodiments, the internal search service may contain different highlight indexes for different document types and querying module 108 may query the relevant highlight index for the type of document being highlighted.

At step 308, one or more of the systems described herein may send the analyzer, the document, and the search query to a search service in order to enable the search service to display at least one highlighted string extracted from the document via the analyzer, where the highlighted string originates from the search query. For example, sending module 110 may, as part of computing device 202 in FIG. 2, send analyzer 210, document 214, and search query 212 to a search service in order to enable the search service to display at least one highlighted string extracted from document 214 via analyzer 210, where the highlighted string originates from search query 212.

Sending module 110 may send the analyzer, document, and/or search query in a variety of ways. In one embodiment, sending module 110 may send the analyzer, document, and/or search query to the external search service in order for the external search service to display highlighted search results to a user.

Figure 5:
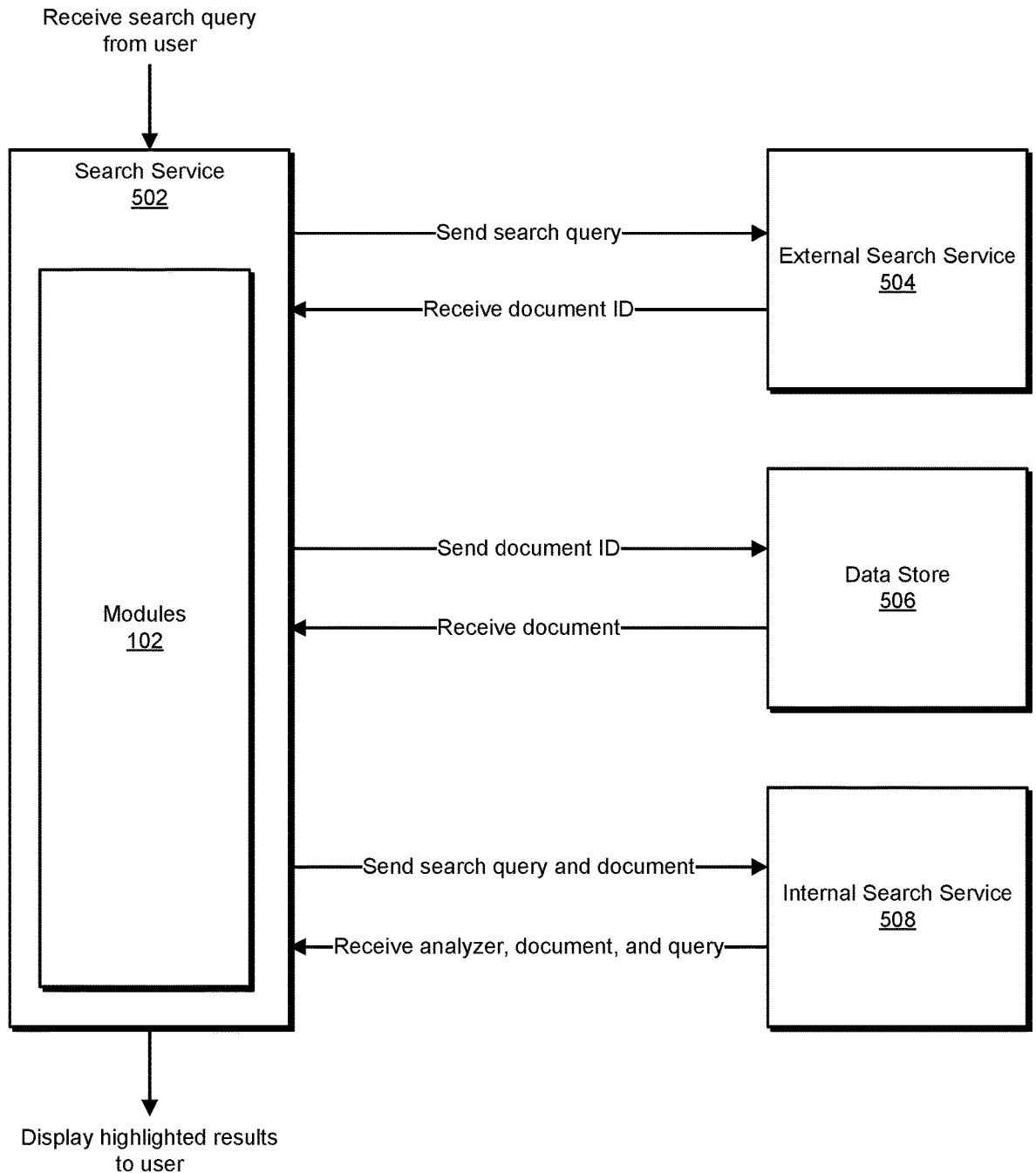
FIG. 5 is a block diagram of an exemplary computing system for enabling search services to highlight documents.

In another embodiment, sending module 110 may send the analyzer document, and/or search query to a search service that communicates with the other search services. In this embodiment, the search service may also display a highlighted search result for the search query that may include the name, title, and/or subject, of one or more documents, attributes of one or more documents, a link and/or pointer to one or more documents, and/or highlighted snippets of the contents of one or more documents. As illustrated in FIG. 5, a search service 502 may include one or more of modules 102 and/or may communicate with an external search service 504, a data store 506, and/or an internal search service 508.

First, search service 502 may receive a search query from a user. Next, search service 502 may send the search query to external search service 504 and receive one or more document IDs in return. Then, search service 502 may send the document IDs to data store 506 and may receive in return one or more documents that correspond to the document IDs. Search service 502 may then send the query and the document to internal search service 508, which may reply with the analyzer, document, and query. In some embodiments, internal search service 508 may reply with search results that are formatted to be displayed with highlights. For example, internal search service 508 may reply with one or more strings similar to, "this application described improved<em>search highlighting</em>" in response to a query that includes the term "search highlighting." Finally, search service 502 may display the highlighted results to a user. In some embodiments, search service 502 may communicate with external search service 504, data store 506, and/or internal search service 508 via an application programming interface.

In some embodiments, search service 502 may communicate with external search service 504, data store 506, and/or internal search service 508 in batches. For example, if external search service 504 retrieves one hundred document IDs, search service 502 may retrieve ten documents at a time for data store 506 and/or send ten queries at a time to internal search service 508. By batching requests in this manner, the systems described herein may efficiently utilize network resources.

In some embodiments, one or more of the systems described herein may be hosted on multiple servers, for example, for load balancing purposes. For example, external search service 504 and/or internal search service 508 may be hosted on multiple servers, nodes, and/or clusters. In some embodiments, search service 502 and/or data store 506 may also be spread over multiple servers, nodes, and/or clusters. In some embodiments, by hosting the internal search service and the external search services on different clusters, the systems described herein may be able to better scale each cluster to the demands of each search service, improving efficiency.

In some examples, the search service may communicate with multiple external search services and/or data stores. For example, the search service may communicate with an external search service and data store for a particular organization that are separate from an external search service and data store for another organization with which the search service also communicates.

In some embodiments, the systems described herein may also highlight data that is not stored in a data store. In some examples, the systems described herein may receive the documents from an external source. In other examples, the systems described herein may retrieve the documents.

As described in connection with method 300 above, the systems and methods described herein may provide an independent scale-out highlighter service without storing the content to be highlighted in the search engine by leveraging capabilities of a search engine for parsing the search query and tokenizing the content. The systems described herein may be used to highlight data from external sources (e.g., search engines) for standard document types. The systems described herein may accomplish this by creating an extremely light-weight and in-memory highlight index that is a replica of an original index from an external search engine, but with an additional field with a pre-defined value. The systems described herein may then invoke the highlight service after getting the search results from the main index of the external search engine. The request parameters sent to the highlight index may include a highlight search query and the per-field content to be highlighted. The systems described herein may ensure that the highlight query forces a search hit on the highlight index by matching on the additional field with pre-defined value, which provides the systems described herein with access to per-field analyzers defined in the original index. The systems described herein may then highlight the content passed using the search query (which was wrapped in the highlight query) and the token stream of the per-field content. By separating the highlight service from the external search service, the systems described herein may perform fast and efficient search result highlighting with a minimum of security concerns. In addition, by leveraging the capabilities of an internal search service to retrieve the analyzer, the systems described herein may be more maintainable than a custom highlighting solution.

Figure 6:
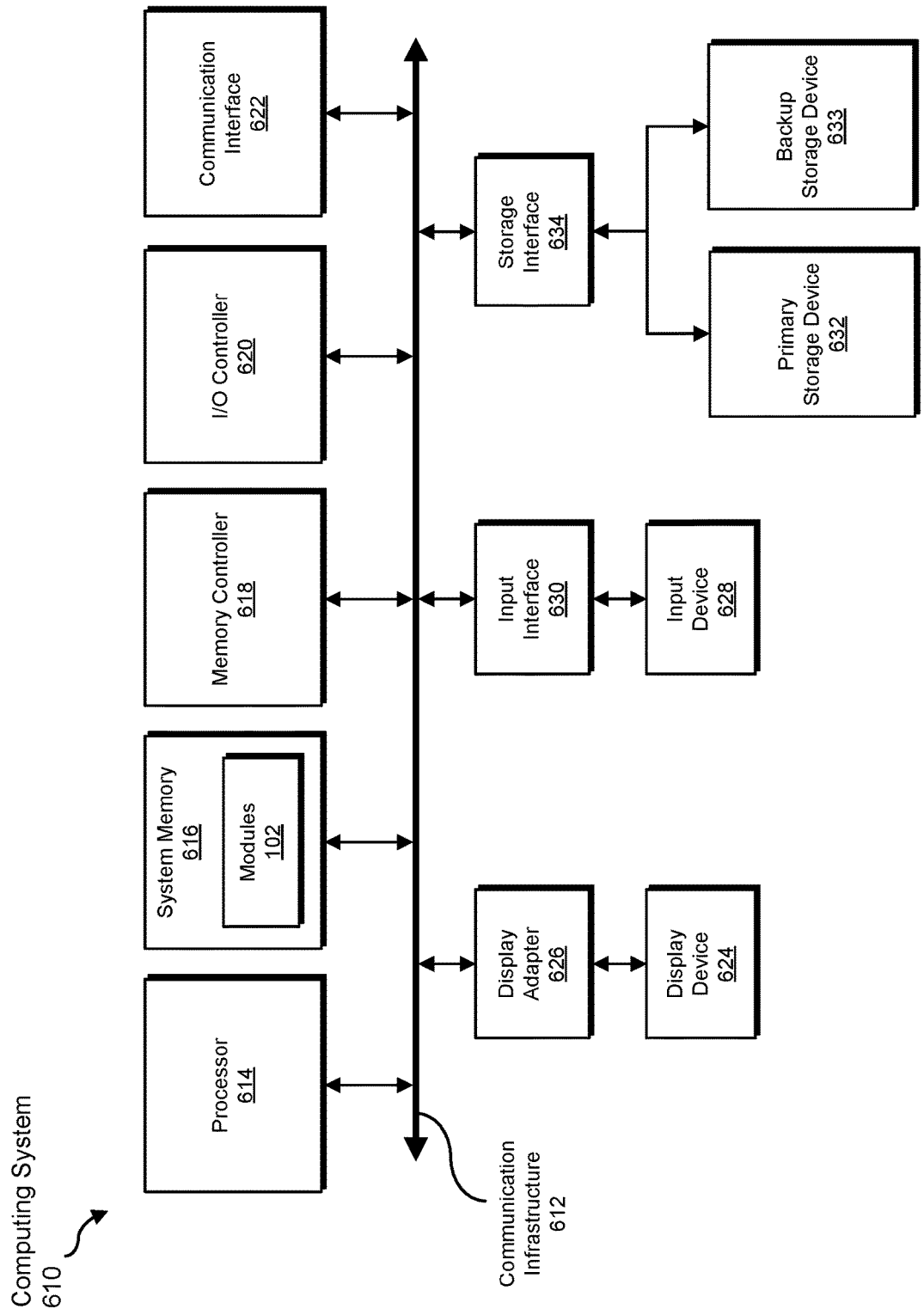
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
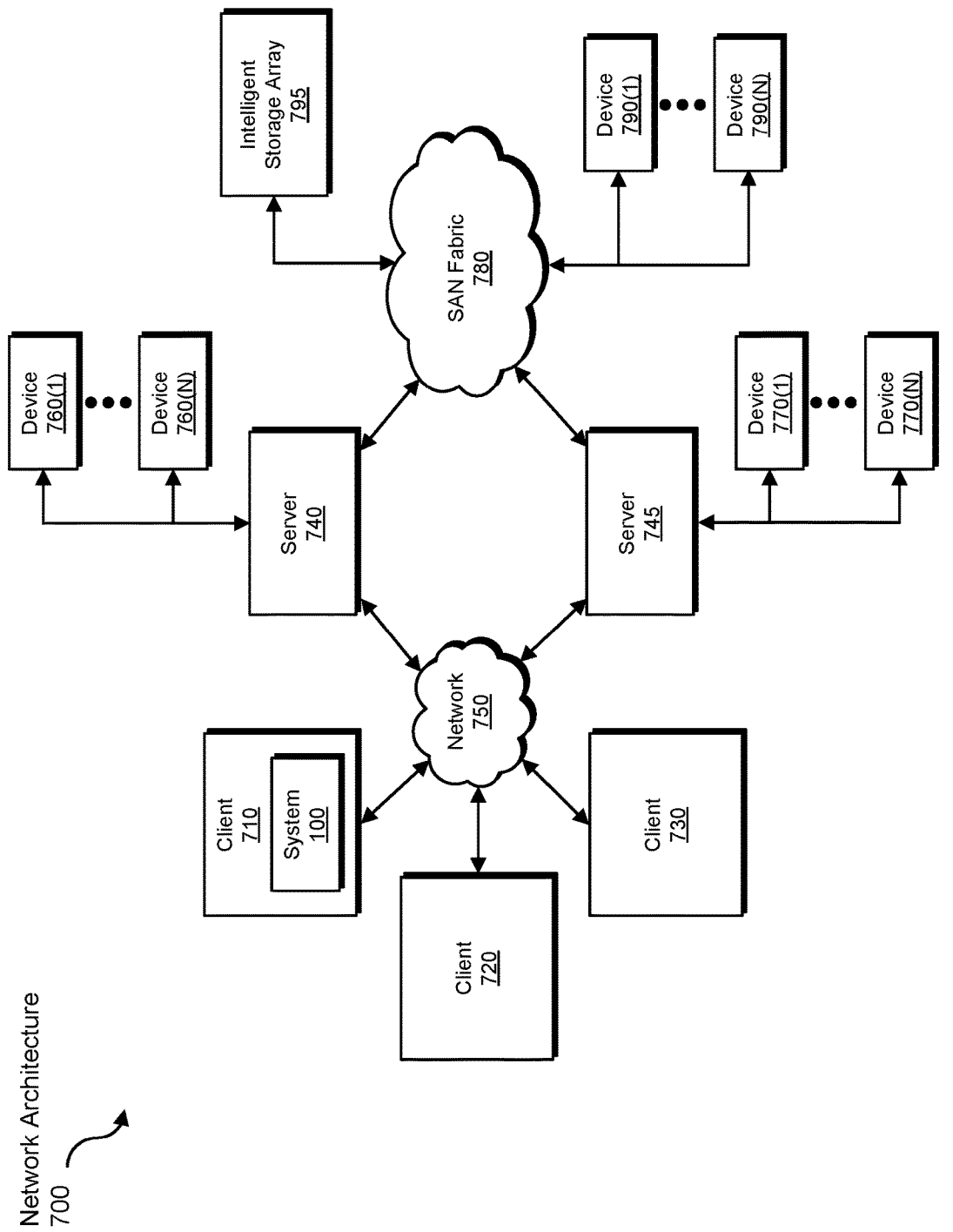
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for enabling search services to highlight documents.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive search data to be transformed, transform the search data by using an analyzer, output a result of the transformation to a search service, use the result of the transformation to display highlighted search results, and store the result of the transformation to a record. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enabling search services to highlight documents, at least a portion of the method being performed by a computing device comprising at least one processor, the method comprising:

creating, via an internal search service, a highlight index that comprises an analyzer for at least one specified type of document, the analyzer comprising at least a portion of executable software code configured to analyze a document of the specified document type, wherein the internal search service has access to the full content of the document;

creating an in-memory highlight index for a highlight service that is a replica of an original index from an external search service, wherein the in-memory replica highlight index includes a specified field that is additional to existing fields in the original index, the additional field including a predefined value, and wherein creating the highlight index comprises creating a dummy document attribute field and populating the dummy document attribute field with a same predetermined value for each document in the highlight index;

receiving a search query configured for the external search service and the document that is of the specified document type and that comprises a search result for the search query, the external search service having limited access to the document to reduce security concerns, such that the external search service is only able to access a portion of the document, wherein the external search service is configured to tokenize the search results for the search query, allowing access to per-field analyzers defined in the original index;

querying the highlight index in order to retrieve the analyzer for the type of document from the highlight index, wherein the querying includes request parameters that force a search hit on the in-memory highlight index by matching the additional field with the predefined value, and wherein querying the highlight index comprises searching for at least one document where a value of the dummy document attribute field comprises the predetermined value; and sending the analyzer including its corresponding computer-executable software code, the document formatted to be displayed with highlights by the internal search service, and the search query wrapped in a highlight query from the internal search service to the external search service in order to enable the external search service to display at least one highlighted string extracted from the document via the analyzer, wherein the highlighted string originates from the search query, and wherein the at least one highlighted string comprises the tokenized search results obtained using the per-field analyzers.

2. The computer-implemented method of claim 1, wherein creating the highlight index comprises creating a search index that comprises exactly one document.

3. The computer-implemented method of claim 1, wherein creating, via the internal search service, the highlight index that comprises the analyzer for the type of document comprises duplicating an analyzer from the external search service for the type of document.

4. The computer-implemented method of claim 1, wherein the external search service only stores a portion of the contents of the document.

5. The computer-implemented method of claim 1, wherein receiving the search query configured for the external search service comprises receiving the search query from the external search service.

6. The computer-implemented method of claim 1, wherein receiving the document that comprises the search result for the search query comprises receiving the document from a data store after the document has been retrieved from the data store via sending the data store a document identifier found by the external search service.

7. The computer-implemented method of claim 1, further comprising displaying, by the external search service, a displayed search result for the search query that comprises an identifier of the document and the highlighted string.

8. A system for enabling search services to highlight documents, the system comprising:

a creation module, stored in memory, that:

creates, via an internal search service, a highlight index that comprises an analyzer for at least one specified type of document, the analyzer comprising at least a portion of executable software code configured to analyze a document of the specified type, wherein the internal search service has access to the full content of the document; and creates an in-memory highlight index for a highlight service that is a replica of an original index from an external search service, wherein the in-memory replica highlight index includes a specified field that is additional to existing fields in the original index, the additional field including a predefined value, and wherein creating the highlight index comprises creating a dummy document attribute field and populating the dummy document attribute field with a same predetermined value for each document in the highlight index;

a receiving module, stored in memory, that receives a search query configured for the external search service and the document that is of the specified document type and that comprises a search result for the search query, the external search service having limited access to the document to reduce security concerns, such that the external search service is only able to access a portion of the document, wherein the external search service is configured to tokenize the search results for the search query, allowing access to per-field analyzers defined in the original index;

a querying module, stored in memory, that queries the highlight index in order to retrieve the analyzer for the type of document from the highlight index, wherein the querying includes request parameters that force a search hit on the in-memory highlight index by matching the additional field with the predefined value, and wherein querying the highlight index comprises searching for at least one document where a value of the dummy document attribute field comprises the predetermined value;

a sending module, stored in memory, that sends the analyzer including its corresponding computer-executable software code, the document formatted to be displayed with highlights by the internal search service, and the search query wrapped in a highlight query from the internal search service to the external search service in order to enable the external search service to display at least one highlighted string extracted from the document via the analyzer, wherein the highlighted string originates from the search query, and wherein the at least one highlighted string comprises the tokenized search results obtained using the per-field analyzers; and at least one physical processor configured to execute the creation module, the receiving module, the querying module, and the sending module.

9. The system of claim 8, wherein the creation module creates the highlight index by creating a search index that comprises exactly one document.

10. The system of claim 8, wherein the creation module creates, via the internal search service, the highlight index that comprises the analyzer for the type of document by duplicating an analyzer from the external search service for the type of document.

11. The system of claim 8, wherein the external search service only stores a portion of the contents of the document.

12. The system of claim 8, wherein the receiving module receives the search query configured for the external search service by receiving the search query from the external search service.

13. The system of claim 8, wherein the receiving module receives the document that comprises the search result for the search query by receiving the document from a data store after the document has been retrieved from the data store via sending the data store a document identifier found by the external search service.

14. The system of claim 8, further comprising a displaying module, stored in memory, that displays, by the external search service, a displayed search result for the search query that comprises an identifier of the document and the highlighted string.

15. A non-transitory computer-readable medium comprising one or more computer-readable instructions that, when executed by at least one processor of a computing device, cause the computing device to:
- create, via an internal search service, a highlight index that comprises an analyzer for at least one specified type of document, the analyzer comprising at least a portion of executable software code configured to analyze a document of the specified type, wherein the internal search service has access to the full content of the document;
- create an in-memory highlight index for a highlight service that is a replica of an original index from an external search service, wherein the in-memory replica highlight index includes a specified field that is additional to existing fields in the original index, the additional field including a predefined value, and wherein creating the highlight index comprises creating a dummy document attribute field and populating the dummy document attribute field with a same predetermined value for each document in the highlight index;
- receive a search query configured for the external search service and the document that is of the specified document type and that comprises a search result for the search query, the external search service having limited access to the document to reduce security concerns, such that the external search service is only able to access a portion of the document, wherein the external search service is configured to tokenize the search results for the search query, allowing access to per-field analyzers defined in the original index;
- query the highlight index in order to retrieve the analyzer for the type of document from the highlight index, wherein the querying includes request parameters that force a search hit on the in-memory highlight index by matching the additional field with the predefined value, and wherein querying the highlight index comprises searching for at least one document where a value of the dummy document attribute field comprises the predetermined value; and
- send the analyzer including its corresponding computer-executable software code, the document formatted to be displayed with highlights by the internal search service, and the search query wrapped in a highlight query from the internal search service to the external search service in order to enable the external search service to display at least one highlighted string extracted from the document via the analyzer, wherein the highlighted string originates from the search query, and wherein the at least one highlighted string comprises the tokenized search results obtained using the per-field analyzers.

16. The non-transitory computer-readable medium of claim 15, wherein the one or more computer-readable instructions cause the computing device to create the highlight index by creating a search index that comprises exactly one document.

17. The non-transitory computer-readable medium of claim 15, wherein the one or more computer-readable instructions cause the computing device to create, via the internal search service, the highlight index that comprises the analyzer for the type of document by duplicating a analyzer from the external search service for the type of document.

* * * * *